(12) United States Patent
Petrucci et al.

(10) Patent No.: US 9,087,348 B2
(45) Date of Patent: Jul. 21, 2015

(54) DIGITAL CONTENT NETWORKING

(75) Inventors: David R. Petrucci, Warren, MI (US);
Charles A. Massoll, Milford, MI (US);
Thiep T. Nguyen, Macomb, MI (US);
Mark A. Wisnewski, Stockbridge, MI (US); David J. Trzcinski, Howell, MI (US); Anna Saadatjoo, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 225 days.

(21) Appl. No.: 13/207,794

(22) Filed: Aug. 11, 2011

(65) Prior Publication Data

US 2013/0041580 A1   Feb. 14, 2013

(51) Int. Cl.
| | |
|---|---|
| G06F 19/00 | (2011.01) |
| G06Q 30/02 | (2012.01) |
| H04W 48/18 | (2009.01) |
| H04L 29/08 | (2006.01) |
| H04W 64/00 | (2009.01) |

(52) U.S. Cl.
CPC ............ G06Q 30/0265 (2013.01); H04L 67/12 (2013.01); H04W 48/18 (2013.01); H04W 64/00 (2013.01)

(58) Field of Classification Search
CPC combination set(s) only.
See application file for complete search history.

(56) References Cited

U.S. PATENT DOCUMENTS

| | | | |
|---|---|---|---|
| 6,721,572 B1 | 4/2004 | Smith et al. | |
| 7,292,918 B2* | 11/2007 | Silvester | 701/33.4 |
| 7,899,614 B2* | 3/2011 | Bhogal et al. | 701/425 |
| 8,423,070 B2* | 4/2013 | Scharf-Katz et al. | 455/522 |
| 8,443,312 B2* | 5/2013 | Tsai et al. | 716/55 |
| 8,492,638 B2* | 7/2013 | Faenger et al. | 84/615 |
| 8,493,981 B2* | 7/2013 | Yousefi et al. | 370/395.42 |
| 8,811,189 B2* | 8/2014 | Pandey et al. | 370/241 |
| 2002/0029108 A1 | 3/2002 | Liu et al. | |
| 2003/0040272 A1 | 2/2003 | Lelievre et al. | |
| 2003/0125043 A1* | 7/2003 | Silvester | 455/456 |
| 2004/0030493 A1* | 2/2004 | Pechatnikov et al. | 701/208 |
| 2004/0203436 A1* | 10/2004 | Oesterling | 455/67.11 |
| 2004/0261097 A1* | 12/2004 | Hanks | 725/29 |
| 2005/0086063 A1* | 4/2005 | Silverbrook | 705/1 |
| 2005/0091408 A1* | 4/2005 | Parupudi et al. | 709/246 |

(Continued)

FOREIGN PATENT DOCUMENTS

| | | |
|---|---|---|
| CN | 1714354 A | 12/2005 |
| DE | 102005008693 A1 | 8/2006 |
| DE | 60118692 T2 | 4/2007 |

OTHER PUBLICATIONS

German Office Action for German Application Serial No. 102012213956.7, Mailed Jun. 6, 2014; 6 pages.

(Continued)

*Primary Examiner* — Jonathan L Sample
(74) *Attorney, Agent, or Firm* — Cantor Colburn LLP

(57) ABSTRACT

Mobile network services for a vehicle are provided via a computer processing device, and a digital communications module executable by the computer processing device. The digital communications module identifies a content channel selection for content presented on a device in the vehicle, continuously receives information indicating a location of the vehicle, and monitors signal strength of the content as the vehicle moves among location. Upon determining a threshold signal strength is reached, the digital communications module determines an action to be taken, and performs the action.

19 Claims, 3 Drawing Sheets

(56) References Cited

U.S. PATENT DOCUMENTS

| | | | |
|---|---|---|---|
| 2005/0246334 A1* | 11/2005 | Tao et al. ............................ 707/5 |
| 2006/0063554 A1* | 3/2006 | Scharf-Katz et al. .......... 455/522 |
| 2006/0211446 A1 | 9/2006 | Wittmann et al. |
| 2007/0005609 A1* | 1/2007 | Breed ............................. 707/10 |
| 2007/0010192 A1* | 1/2007 | Kawamata et al. ........... 455/3.02 |
| 2007/0037534 A1* | 2/2007 | Doudnikoff et al. ........ 455/185.1 |
| 2007/0064644 A1* | 3/2007 | Dowling et al. .............. 370/328 |
| 2007/0085739 A1* | 4/2007 | Udall ....................... 342/357.17 |
| 2008/0133082 A1* | 6/2008 | Rasin et al. ...................... 701/36 |
| 2008/0162147 A1* | 7/2008 | Bauer ........................... 704/275 |
| 2008/0215236 A1* | 9/2008 | Deurwaarder et al. ........ 701/202 |
| 2008/0221782 A1* | 9/2008 | Deurwaarder et al. ........ 701/117 |
| 2008/0249969 A1* | 10/2008 | Tsui et al. ........................ 706/46 |
| 2009/0228199 A1* | 9/2009 | Bhogal et al. ................. 701/201 |
| 2010/0023246 A1* | 1/2010 | Zhao et al. .................... 701/117 |
| 2010/0131642 A1* | 5/2010 | Chalikouras et al. ......... 709/224 |
| 2010/0164790 A1* | 7/2010 | Wisnewski et al. ...... 342/357.09 |
| 2010/0175014 A1* | 7/2010 | Obradovich ................. 715/771 |
| 2010/0220250 A1* | 9/2010 | Vanderwall et al. .......... 348/837 |
| 2010/0234071 A1* | 9/2010 | Shabtay et al. ............. 455/562.1 |
| 2010/0235891 A1* | 9/2010 | Oglesbee et al. .................. 726/5 |
| 2010/0255781 A1* | 10/2010 | Wirola et al. ................. 455/41.2 |
| 2011/0035031 A1* | 2/2011 | Faenger et al. ................. 700/94 |
| 2011/0069680 A1* | 3/2011 | Krause et al. ................. 370/332 |
| 2011/0164135 A1* | 7/2011 | Schofield et al. ............. 348/148 |
| 2011/0167128 A1 | 7/2011 | Raghunathan et al. |
| 2011/0202153 A1* | 8/2011 | Munch et al. ................... 700/94 |
| 2011/0207423 A1* | 8/2011 | Tarte ......................... 455/186.1 |
| 2011/0320066 A1* | 12/2011 | Schofield et al. .................. 701/1 |
| 2012/0030512 A1* | 2/2012 | Wadhwa et al. ................. 714/23 |
| 2012/0098717 A1* | 4/2012 | Petrucci et al. ............... 343/713 |
| 2012/0110356 A1* | 5/2012 | Yousefi et al. ................ 713/320 |
| 2012/0258705 A1* | 10/2012 | Wisnewski et al. ........... 455/423 |

OTHER PUBLICATIONS

Chinese Office Action for related Chinese Application No. 201210283750.5 dated Oct. 10, 2014; 8 pages.

\* cited by examiner

DIGITAL CONTENT NETWORKING

FIELD OF THE INVENTION

The subject invention relates to mobile communications and, more particularly, to digital content networking for mobile devices.

BACKGROUND

Many of today's automobiles come equipped with a number of value-added services and related devices. Onboard vehicle navigation and roadside service components are just some of the items offered to consumers. Additionally, infotainment systems that provide enhanced audio services (e.g., digital radio) and/or video (e.g., television content) are often provided to vehicle purchasers for an additional fee.

Infotainment services, such as digital radio and television provide entertainment to vehicle occupants and can be a valuable option on vehicles particularly during extended or routine trips. However, these features are oftentimes disrupted when network coverage in a particular area becomes sporadic.

Accordingly, it is desirable to provide a way to minimize disruptions of content provided for a vehicle that is en route to a destination.

SUMMARY OF THE INVENTION

In one exemplary embodiment of the invention a system for providing mobile networking services for a vehicle is provided. The system includes a computer processing device and a digital communications module executable by the computer processing device. The digital communications module implements a method. The method includes identifying a content channel selection for content presented on a device in the vehicle, continuously receiving information indicating a location of the vehicle, and monitoring signal strength of the content as the vehicle moves among locations. Upon determining a threshold signal strength is reached, the method includes determining an action to be taken, and performing the action.

In another exemplary embodiment of the invention a method for providing mobile networking services for a vehicle is provided. The method includes identifying a content channel selection for content presented on a device in the vehicle, continuously receiving information indicating a location of the vehicle, and monitoring signal strength of the content as the vehicle moves among locations. Upon determining a threshold signal strength is reached, the method includes determining an action to be taken, and performing the action.

In yet another exemplary embodiment of the invention a computer program product for providing mobile networking services for a vehicle is provided. The computer program product includes a computer storage medium having program instructions embodied thereon, which when executed by a computer processor cause the computer processor to implement a method. The method includes identifying a content channel selection for content presented on a device in the vehicle, continuously receiving information indicating a location of the vehicle, and monitoring signal strength of the content as the vehicle moves among locations. Upon determining a threshold signal strength is reached, the method includes determining an action to be taken, and performing the action.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
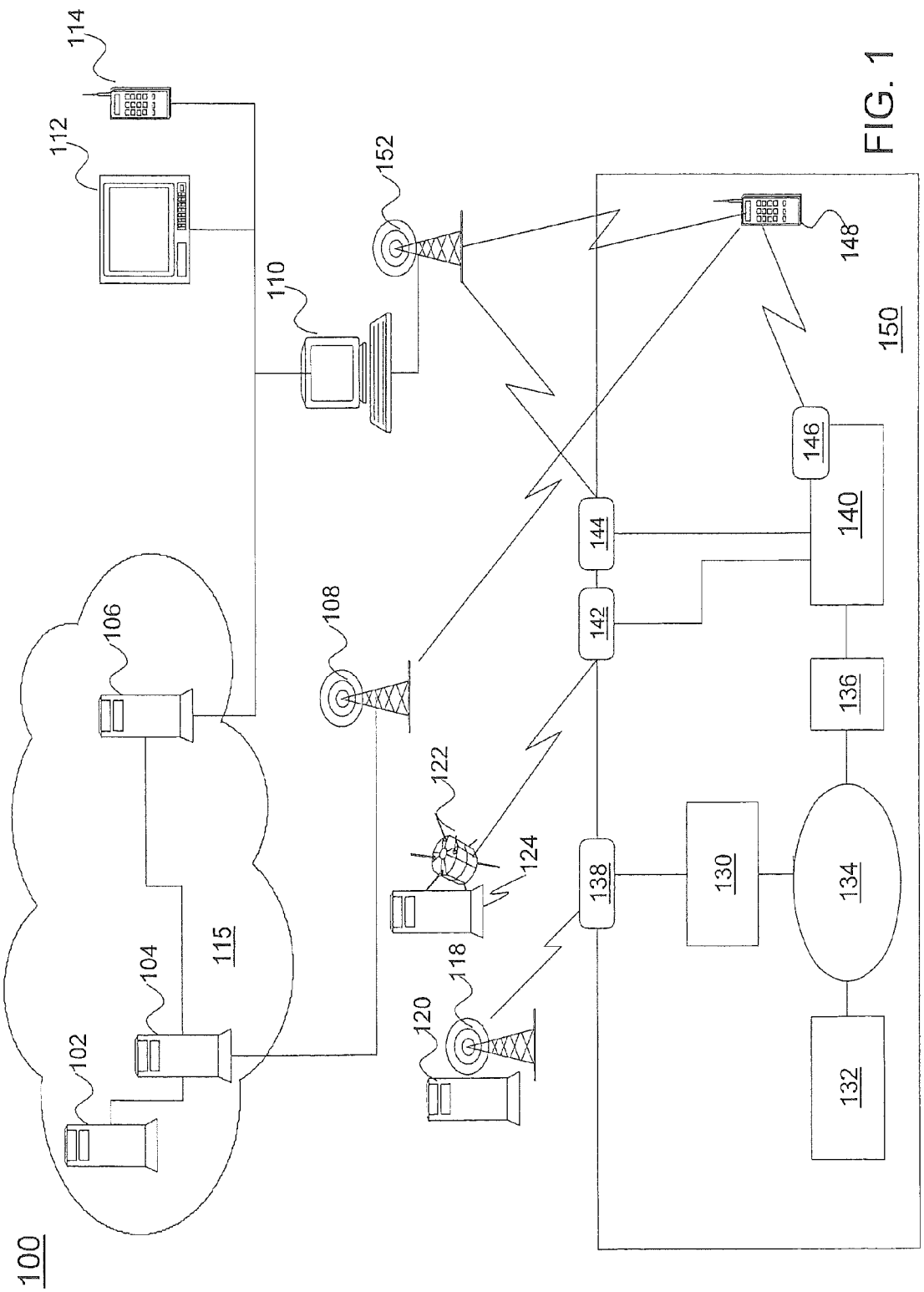
FIG. 1 is a diagram of a system upon which mobile networking services may be implemented in an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, mobile networking services are provided. The mobile networking services monitor signal strength for a content channel presented in a vehicle, and enables an end user of the mobile networking services to configure vehicle components to provide continued, uninterrupted presentation of the content based on the signal strength identified through the monitoring.

The mobile network services are configured to recognize if the desired digital content is no longer available within a predetermined distance, and provide notification to the end user. The notification may be a message indicating a weakened signal and/or instructions on how to navigate the vehicle to continue presentation of the content without disruption. In addition, the mobile networking services may track other vehicle conditions and notify the user when signal strength of the content is weakening, in conjunction with a recommendation for vehicle service or maintenance in the region based on the tracked vehicle conditions, such that the end user can continue to enjoy the content during the vehicle servicing and while the signal is still acceptable.

In an exemplary embodiment, the mobile networking services may be configured to enable an end user who is receiving content in one location, e.g., at home or work, to continue to receive the content upon transitioning to the vehicle for travel.

In addition, the mobile networking services may be configured to provide in-vehicle tutorials on the use of the mobile networking services. These, and other features of the mobile networking services will now be described.

Turning now to FIG. 1, a system upon which mobile networking services may be implemented will now be described in accordance with an embodiment. The system 100 of FIG. 1 illustrates a portion of a vehicle 150 in communication with a network 115, a digital television (DTV) service provider system 120 (referred to herein as "DTV system") via a communications tower 118, and a satellite service provider system 124 (also referred to herein as "satellite system") via a satellite 122. The vehicle 150 may be any type of automobile equipped with communications components, as described herein.

In an embodiment, the network 115 includes an Internet Protocol television (IPTV) system 102, a cellular network service provider system 104 (also referred to herein as "cellular service provider system"), and a host system 106. The host system 106 is in communication with a computer 110, a television 112, and a personal mobile device 114. In an exemplary embodiment, the host system 106 provides mobile networking services to an account holder associated with one or more users of the computer 110, television 112, personal mobile device 114, and vehicle 150. The IPTV system 102 provides Internet services to one or more of the computer 110, the television 112, and the personal mobile device 114.

In an embodiment, the IPTV system 102, cellular service provider system 104, host system 106, DTV system 120, and satellite system 122 may each be implemented by a high-speed computer processing device, such as a mainframe computer, or similar type of device capable of handling the volume of activities conducted on behalf of its customers.

The computer 110 may be a general-purpose or desktop computer, or may be portable computer device, such as a laptop. The television 112 includes Internet Protocol-enabled components (e.g., via a computer processor installed therein or via a peripheral component, such as a set top box), such that the television 112 receives and communicates interactively over a network, such as the network 115. The personal mobile device 114 may be a cellular telephone or smart phone. In one embodiment, the computer, television, 112, and personal mobile device 114 are communicatively coupled to one another via a local area network.

The network 115 may be a combination of networks, such as a cellular network and Internet.

The vehicle 150 includes an infotainment system that provides content to occupants of the vehicle 150. The infotainment system includes a wireless device 140, a communication bus 134, and a DTV/IPTV module 130. The content may include DTV content and/or IPTV content. DTV content refers to audio and video television programming transmitted as digital signals, as compared to analog signals of traditional analog stations. The content may be transmitted over-the-air as digital packets of data via communications towers (e.g., the communications tower 118) in communicative range of a receiving device (e.g., the vehicle 150). The DTV content is provided by the DTV system 120 and the communications tower 118 to a DTV antenna 138 of the vehicle 150.

IPTV content refers to Internet-based programming including web-based content that is distributed over one or more networks (e.g., the network 115) to the vehicle 150, as well as to one or more of the computer 110, television 112, and personal mobile device 114. In one embodiment, the IPTV content is distributed to the vehicle 150 through a WiFi system 152 and antenna 144. In another embodiment, the IPTV content is provided to the vehicle 150 via the WiFi system 152, and directly to a personal mobile device 148 located in the vehicle 150.

The cellular service provider system 104 provides cellular communications services to personal mobile devices, such as the personal mobile device 114, over a network of communications towers (e.g., communications tower 108). In an embodiment, the personal mobile device 148 located in the vehicle 150 receives cellular communications services from the cellular service provider system 104 and/or from the computer 110 via the WiFi system 152. The personal mobile device 148, which may be a cellular telephone or smart phone, is operated by an occupant of the vehicle 150. Communications between a short-range wireless antenna 146 and the personal mobile device 148 may be implemented using BlueTooth™ protocols or similar types of communications technologies.

The cellular service provider system 104 may also provide cellular communications services directly to the vehicle 150 via the communications tower 108 and a cellular antenna 144 resident on the vehicle 150. The cellular communications are received at, and transmitted by, the wireless device 140 through the cellular antenna 144 and/or through a short-range wireless antenna 146 disposed on the wireless device 140. For example, the vehicle 150 may be equipped with cellular communications components that enable cellular communications to be conducted between the cellular network 115 and the vehicle 150 (via the wireless device 140, short-range wireless antenna 146, and personal mobile device 148), as well as between the cellular network 115 and the personal mobile device 148.

In an embodiment, the vehicle 150 uses signals received from satellites, such as satellite 122 via a global positioning system (GPS) antenna 142 disposed on the vehicle 150. The location information may be received in the form of latitude and longitude coordinates and is used by the wireless device 140 to process the vehicle's location. Additionally, or alternatively, the location information may be tracked via the cellular network, the cellular service provider system 104, and the cellular antenna 144 or the personal mobile device 148 using, e.g., a specialized application running on the vehicle 150 or the personal mobile device 148.

In an embodiment, the wireless device 140 communicates over the vehicle communication bus 134 with the DTV/IPTV module 130, as well as one or more vehicle modules 132. In an embodiment, the DTV/IPTV module 130 is configured to scan programming signals in communication range of the vehicle 150 and to monitor the signal strength of these signals. The DTV/IPTV module 130 may also include logic for performing the mobile networking services, as described herein. The DTV/IPTV may be integrated with a control system of the vehicle 150 or may be a separate system that interoperates with the control system, e.g., via an application programming interface (API).

The vehicle modules 132 may include logic configured to monitor various vehicle operating conditions, such as fuel level, temperature gauges, fluid levels, etc. In an embodiment, modules 132 may include a navigation component that identifies a vehicle location and maps routes to user-specified destinations. In another embodiment, the modules 132 may include roadside assistance components that provide emergency and related services to subscribers, e.g., OnStar®. In yet another embodiment, the modules 132 may include a tutorial that provides assistance to vehicle occupants for using the mobile networking services, and other vehicle components or features, as well as providing useful suggestions, as will be described further herein. A firewall 136 may be established between the communication bus 134 and the wireless device 140 in order to prevent unauthorized attempts to access or modify user-configured mobile networking services settings.

In an embodiment, the wireless device 140 presents content to vehicle occupants. The wireless device 140 may include an audio system (e.g., digital radio) or an audio/video system, such as a television. The wireless device 140 may include a display screen, speakers, channel controls, signal receivers, and related components for receiving and providing content to the occupants. In an embodiment, the wireless device 140 includes a computer processor for communicating with the communication bus 134, as well as other communications devices, such as the personal mobile device 148. In an embodiment, the wireless device 140 may also include a recording component for recording content presented on the wireless device 140. In addition to presenting programming content via the wireless device 140, the mobile networking services may be configured to present tutorials on the wireless device 104 via one of the modules 132.

As indicated above, the mobile networking services enhance a vehicle occupant's infotainment experience by monitoring signals of content active on the infotainment system. The mobile networking services monitor signal strength for a content channel presented in a vehicle, and enable an end user of the mobile networking services to configure vehicle components to provide continued, uninterrupted presentation of the content based on the signal strength identified through the monitoring. The mobile networking services are configured to recognize if the desired digital content is no longer available within a predetermined distance, and provide notification to the end user. The notification may be a message indicating a weakened signal or instructions on how to navigate the vehicle to continue presentation of the content without disruption. In addition, the mobile networking services may track other vehicle conditions and notify the user when signal strength of the content is weakening, in conjunction with a recommendation for vehicle service or maintenance in the region based on the tracked vehicle conditions, such that the end user can continue to enjoy the content during the vehicle servicing and while the signal is still acceptable.

In an embodiment, the mobile networking services may be configured to enable an end user who is receiving content in one location, e.g., via one of the computer 110, television 112, and personal mobile device 114, to continue to receive the content upon transitioning to the vehicle 150 for travel.

Figure 2:
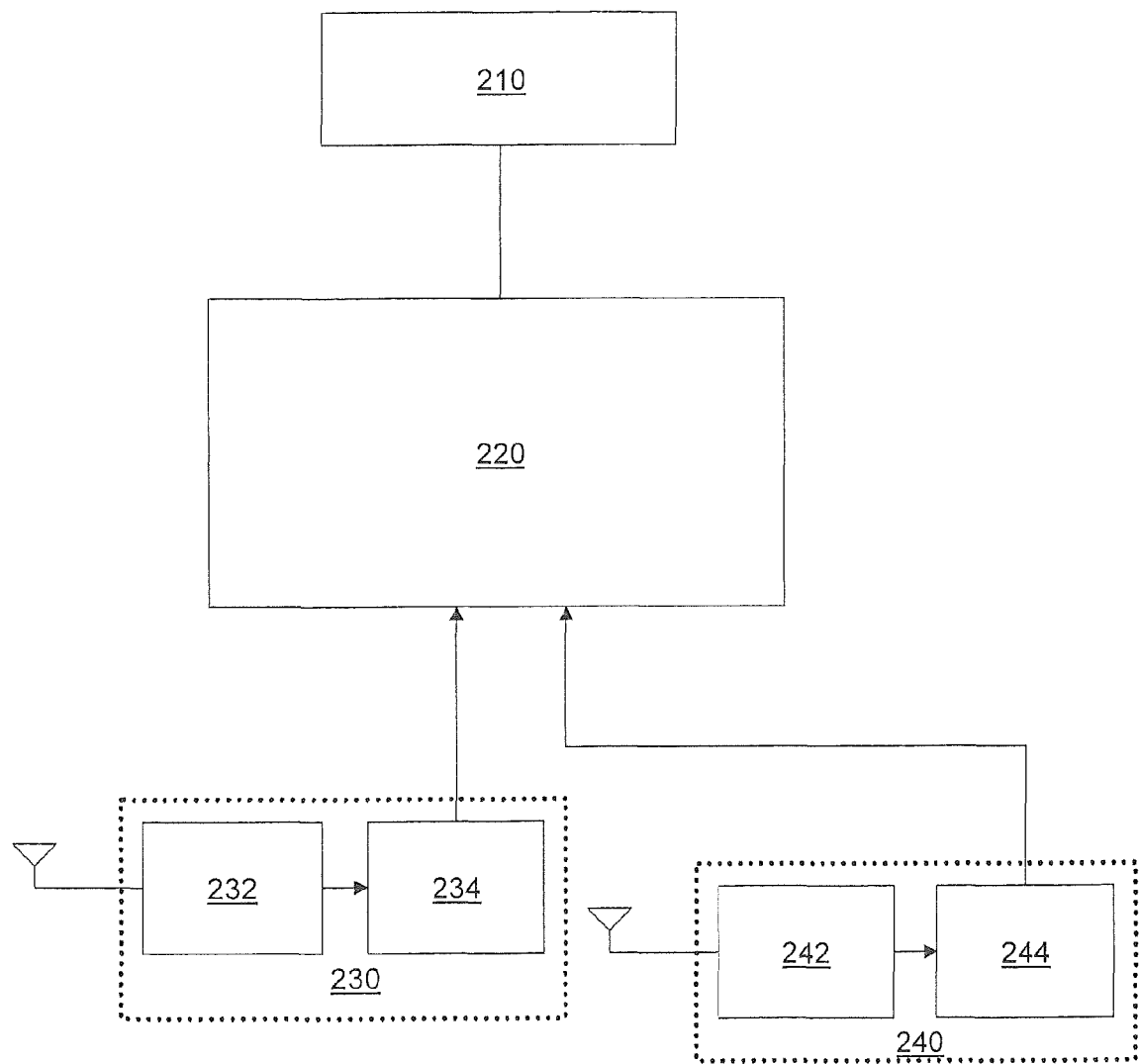
FIG. 2 is a diagram illustrating a detailed portion of the system of FIG. 1 in an exemplary embodiment.

Turning now to FIG. 2, a detailed description of the DTV/IPTV module 130, wireless device 140, and mobile networking services will now be described in an embodiment. DTV/IPTV components are implemented, in part, by a dual tuner module 210 and a program finder and database 220. The dual tuner module 210 includes a first tuner that provides the current viewing at the vehicle 150 and a second tuner that monitors the signal strength of the programming signal.

A location module 230 and a cellular module 240 communicate with the program finder and database 220. Location information is provided by the location module 230 (e.g., via a GPS receiver 232 and communication bus 234) and the cellular module 240 (e.g., via a cellular telephone 242 and communication bus 244) to the program finder and database 220. The program finder and database 220 contains a database of broadcast stations (e.g., through communications towers, such as communications tower 108. The database includes the latitude and longitude of the stations, as well as the broadcast coverage radius of these stations. Based on the inputs (e.g., latitude and longitude) received from the location module 230, the program finder and database 220 performs calculations to determine the vehicle's location relative to the broadcast station in combination with the signal strength to make a decision whether to switch from one source of signals to another (e.g., from communications tower 118 to communications tower 108). The ability to switch between sources of signals enhances the reliability of the signal levels to provide continuous reception with minimal impacts on route, distance, and time.

Figure 3:
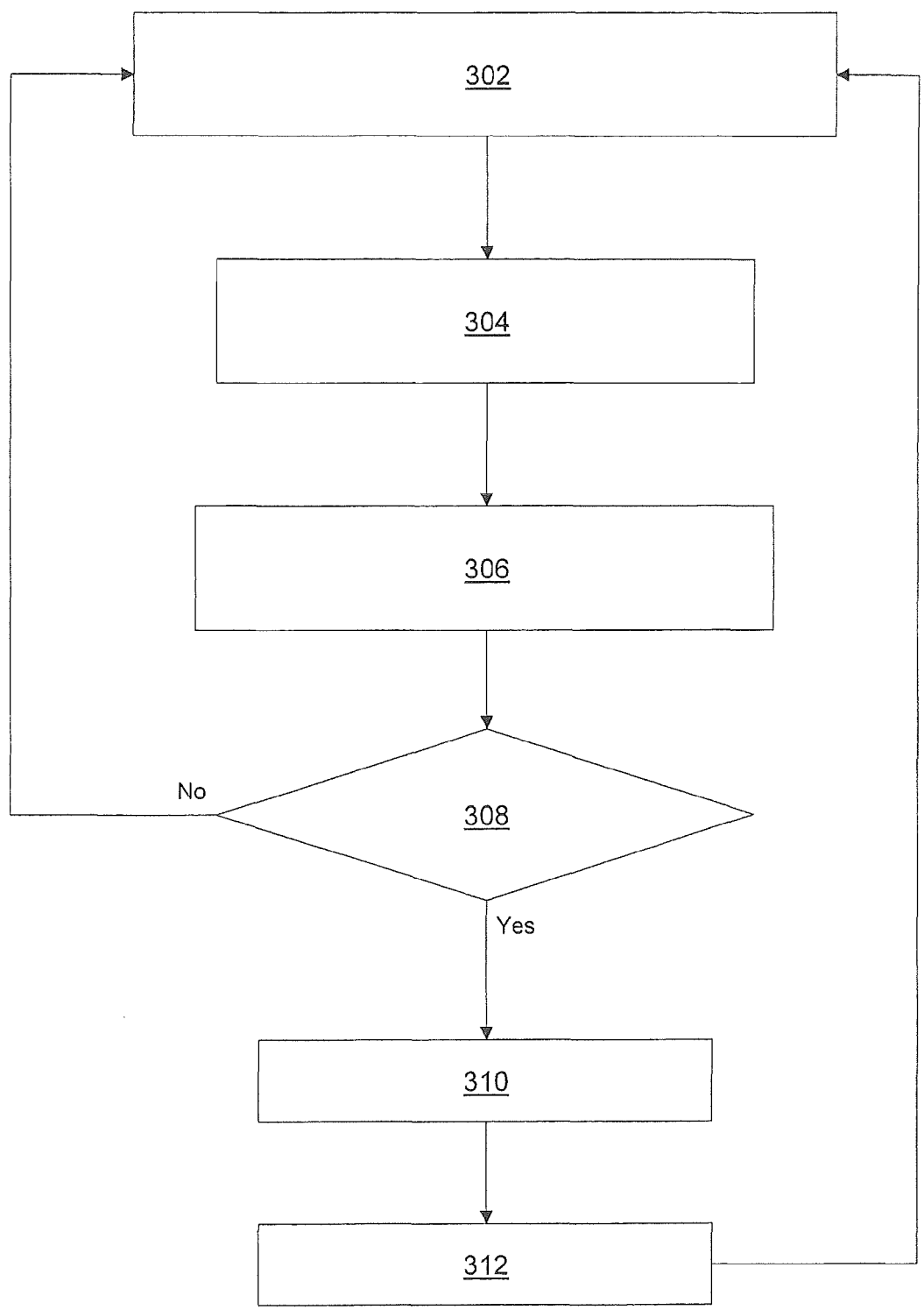
FIG. 3 is a flow diagram of a process for implementing mobile networking services in an exemplary embodiment.

Turning now to FIG. 3, a process for implementing the mobile networking services will now be described in an embodiment. As indicated above, the mobile networking services enhance the infotainment experience of vehicle occupants by tracking signal strengths for an active channel (e.g., a channel currently presented on the wireless device 140) and performing one or more actions based on the results of the tracking.

At step 302, the DTV/IPTV module 130 identifies a content channel selection on the wireless device 140 (e.g., a channel tuned in on the wireless device 140). At step 304, the DTV/IPTV module 130 receives location information tracked via the GPS antenna 142 or the cellular antenna 144 to determine a current location of the vehicle 150. At step 306, the DTV/IPTV module 130 scans for signals in range of the vehicle 150 and determines a signal strength of the content channel on the wireless device 140, as well as a signal strength trend, i.e., whether the signal strength is strengthening, weakening, or remaining the same over time. The DTV/IPTV module 130 may be configured to take action upon the occurrence of a condition that is defined by the signal strength or signal strength trending (e.g., if the signal weakens to a specific level or decreases at a specified rate).

At step 308, the DTV/IPTV module 130 determines whether the condition has occurred. If not, the process returns to step 302 whereby the DTV/IPTV module 130 continues to monitor channel selection (e.g., in the event the occupant switches channels). Otherwise, if the condition has occurred, the DTV/IPTV module 130 determines an action to be taken at step 310, and performs the action at step 312. The process returns to step 302.

The action taken may be configured by the end user of the mobile networking services via, e.g., the DTV/IPTV module 130 and input controls of the wireless device 140. For example, the action taken may be a notification generated and transmitted that informs the occupants of the vehicle of the weakening signal. The notification may be presented on a display of the wireless device 140, output by an audio component of the vehicle 150, or may be transmitted to the personal mobile device 148 via the short-range wireless antenna 146.

In another embodiment, the mobile networking services may be configured to utilize the vehicle navigation system (e.g., one of the modules 132) to provide alternative routes of travel in which the signal is expected to be stronger than the tracked signal. For example, the DTV/IPTV module 130 may receive location information via the GPS antenna 142 or cellular antenna 144, determine locations near the mapped route for which a signal is expected to be stronger, and re-configure the route based on these signals. As indicated above, information from the program finder and database 220 may be used to analyze latitude and longitude data of the stations, as well as the broadcast coverage radius of these stations, in conjunction with the vehicle's current location to anticipate signal strength as the vehicle moves from one location to the next. Based on this information, the DTV/IPTV module 130 may notify the navigation module to provide the alternate route to the vehicle occupants either through the navigation system components, the wireless device 140, or the personal mobile device 148.

In yet a further embodiment, the mobile networking services may be configured to utilize other vehicle modules 132 in determining a particular action to be taken. For example, the vehicle 150 control system may provide fuel or temperature gauge data, or other vehicle component information through one or more vehicle modules 132 to the DTV/IPTV module 130, which uses this information in conjunction with the monitored signal strength information and the location information to recommend a stopping location for servicing the vehicle 150. That is, the DTV/IPTV module 130 may generate and present a notification of a weakening signal and a need for service so that the vehicle operator can decide whether to stop the vehicle 150 while the signal strength is acceptable or continue on (e.g., when the programming is nearing completion or the vehicle 150 is close to home).

In still a further embodiment, the mobile networking services may be configured to enable a user who is receiving content in one location to transition the content over to the vehicle 150 without missing any of the content. For example, a user of the personal mobile device 114 may be configured with logic to communicate requests for content selection and recording to the cellular antenna 144 and wireless device 140, which in turn begins to record a selected channel of content and stores a buffer of the content, such that the user can rewind the content upon entering the vehicle 150.

As indicated above, the mobile networking services may include a tutorial for using the mobile networking services, as well as other vehicle features, which tutorial is presented on the wireless device 140. In one embodiment, the tutorial is implemented as one of the vehicle modules 132 and is configured to monitor driver or occupant activities in the vehicle, assess when the operator or occupant are unsuccessful in these activities, and suggest the tutorial on that particular activity to the operator or occupant. In another embodiment, the tutorial may be offered independent of any activity conducted by the operator or occupant.

Technical effects include enhancing the infotainment experience of occupants of a vehicle by monitoring signal strength for a content channel presented in the vehicle, and enables an end user of the mobile networking services to configure vehicle components to provide continued, uninterrupted presentation of the content based on the signal strength identified through the monitoring.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the application.

What is claimed is:

1. A system for providing mobile networking services for a vehicle, comprising:
    a computer processing device; and
    a digital communications module executable by the computer processing device to:
    receive user-configurable preferences from an occupant of the vehicle, wherein the user-configurable preferences specify actions response to changes in a signal strength particular to a content program presented on a device in the vehicle;
    identify a content channel selected for the content program presented on the device;
    continuously receive information that indicates a location of the vehicle;
    monitor the signal strength of the content program as the vehicle moves among locations;
    determine a trend of the signal strength of the content program in accordance with the monitoring of the signal strength of the content program as the vehicle moves among the locations;
    in response to the determination of the trend of the signal strength of the content program being a weakening of the signal strength, determine which of the actions to perform based on the user-configurable preferences as a first action, wherein the first action is configured to maintain presentation of the content program on the device or on any alternative device in the vehicle;
    perform the first action;
    access a database of locations of content sources, wherein the database includes a coverage range for each of the content sources;
    determine a selection of at least one of the content sources having a coverage range that corresponds to the location of the vehicle and having the content program; and
    in response to the determination of the trend being the weakening of the signal strength, provide continued presentation of the content program by discontinuing transmission of the content program from a current content source and accessing the content program from the selection of the at least one of the content sources.

2. The system of claim 1, wherein the first action includes transmitting a notice of the weakening of the signal strength via at least one of:
    the device; and
    a personal mobile device in communication with the computer processing device.

3. The system of claim 1, wherein the method further comprises:
    determining locations in which the content program is available; and
    calculating an alternate route that includes the locations;
    wherein the first action includes a recommendation to modify a route traveled by the vehicle to include the alternate route.

4. The system of claim 1, wherein the first action includes a recommendation to service the vehicle at a location in which the signal strength is determined to be within a defined threshold level but weakening.

5. The system of claim 4, wherein the method further comprises:
    receiving data from vehicle components; and
    determining a need for servicing the vehicle based on the data received.

6. A method for providing mobile networking services for a vehicle, the method comprising:
    receiving user-configurable preferences from an occupant of the vehicle, the user-configurable preferences specify actions response to changes in a signal strength particular to a content program presented on a device in the vehicle;

identifying a content channel selected for the content program presented on the device;
continuously receiving information indicating a location of the vehicle;
monitoring the signal strength of the content program as the vehicle moves among locations;
determine a trend of the signal strength of the content program in accordance with the monitoring of the signal strength of the content program as the vehicle moves among the locations;
in response to the determination of the trend of the signal strength of the content program being a weakening of the signal strength, determine which of the actions to perform based on the user-configurable preferences as a first action, wherein the first action is configured to maintain presentation of the content program on the device or on an alternative device in the vehicle;
performing the first action;
accessing a database of locations of content sources, the database including a coverage range for each of the content sources;
determining a selection of at least one of the content sources having a coverage range that corresponds to the location of the vehicle and having the content program; and
in response to the determination of the trend being the weakening of the signal strength, providing continued presentation of the content program by discontinuing transmission of the content program from a current content source, and accessing the content program from the selection of the at least one of the content sources.

7. The method of claim 6, wherein the first action includes transmitting a notice of the weakening of the signal strength via at least one of:
the device; and
a personal mobile device in communication with the computer processing device.

8. The method of claim 6, further comprising:
determining locations in which the content program is available; and
calculating an alternate route that includes the locations;
wherein the first action includes a recommendation to modify a route traveled by the vehicle to include the alternate route.

9. The method of claim 6, wherein the first action includes a recommendation to service the vehicle at a location in which the signal strength is determined to be within a defined threshold level but weakening.

10. The method of claim 9, further comprising:
receiving data from vehicle components; and
determining a need for servicing the vehicle based on the data received.

11. A computer program product for providing mobile networking services for a vehicle, the computer program product comprising a computer storage medium embodied with program instructions, which when executed by a computer processor cause the computer processor to perform operations, the operations comprising:
receiving user-configurable preferences from an occupant of the vehicle, the user-configurable preferences specify actions response to changes in a signal strength particular to a content program presented on a device in the vehicle;
identifying a content channel selected for the content program presented on the device;
continuously receiving information indicating a location of the vehicle;
monitoring the signal strength of the content program as the vehicle moves among locations;
determine a trend of the signal strength of the content program in accordance with the monitoring of the signal strength of the content program as the vehicle moves among the locations;
in response to the determination of the trend of the signal strength of the content program being a weakening of the signal strength, determine which of the actions to perform based on the user-configurable preferences as a first action, wherein the first action is configured to maintain presentation of the content program on the device or on any alternative device in the vehicle;
performing the first action;
accessing a database of locations of content sources, the database including a coverage range for each of the content sources;
determining a selection of at least one of the content sources having a coverage range that corresponds to the location of the vehicle and having the content program; and
in response to the determination of the trend being the weakening of the signal strength, providing continued presentation of the content program by discontinuing transmission of the content program from a current content source, and accessing the content program from the selection of the at least one of the content sources.

12. The computer program product of claim 11, wherein the method further comprises:
determining locations in which the content program is available; and
calculating an alternate route that includes the locations;
wherein the first action includes a recommendation to modify a route traveled by the vehicle to include the alternate route.

13. The computer program product of claim 11, wherein the first action includes a recommendation to service the vehicle at a location in which the signal strength is determined to be within a defined threshold level but weakening.

14. The computer program product of claim 13, wherein the method further comprises:
receiving data from vehicle components; and
determining a need for servicing the vehicle based on the data received.

15. The system of claim 1, further comprising a dual-mode tuner, wherein a first tuner of the dual-mode tuner presents the content program and the second tuner of the dual-mode tuner monitors the signal strength of the content program.

16. The system of claim 1, further comprising a tutorial module executable by the computer processing device, the tutorial module configured to guide a user in entering the user-configurable preferences.

17. The system of claim 1, wherein the content sources include an IPTV content source, a broadcast content source, a digital radio content source, a digital television content source, and content programming stored a storage device onboard the vehicle.

18. The system of claim 1, wherein the trend is one of a strengthening of the signal strength, the weakening of the signal strength, and a consistent of the signal strength.

19. The system of claim 1, wherein the weakening of the signal strength is a decrease at a specified rate.

* * * * *